April 18, 1950      J. W. HAYWARD      2,504,524
SAFETY SPECTACLE BRIDGE LIFT
Filed Aug. 21, 1946      2 Sheets-Sheet 1
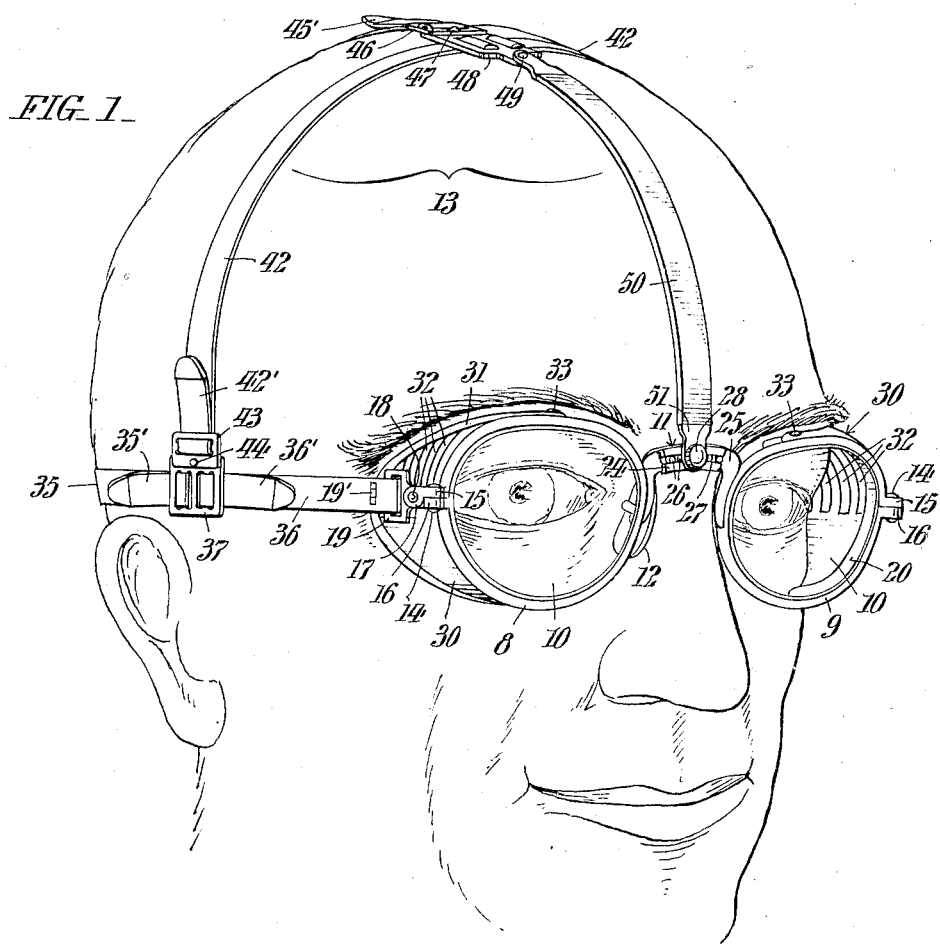
FIG_1_
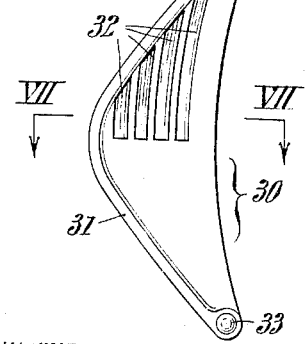
FIG_6_
FIG_7_
WITNESSES
INVENTOR:
Jay W. Hayward,
BY Paul & Paul
ATTORNEYS.

April 18, 1950  J. W. HAYWARD  2,504,524
SAFETY SPECTACLE BRIDGE LIFT
Filed Aug. 21, 1946  2 Sheets-Sheet 2
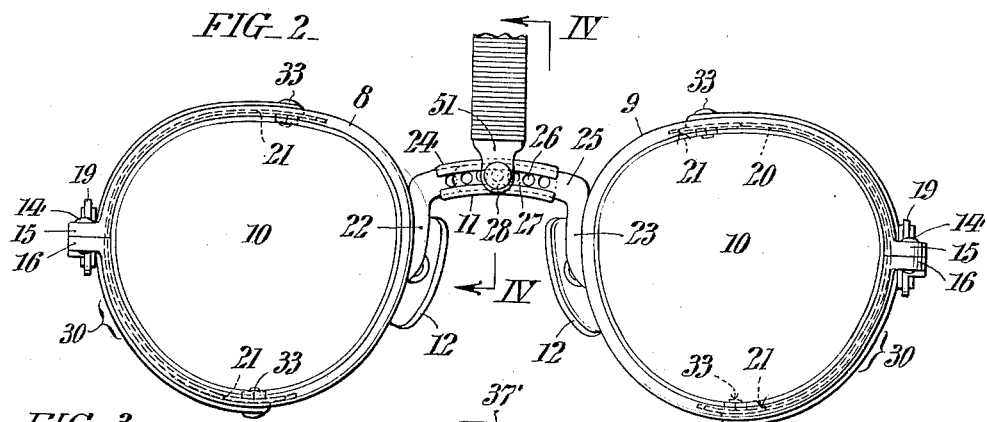
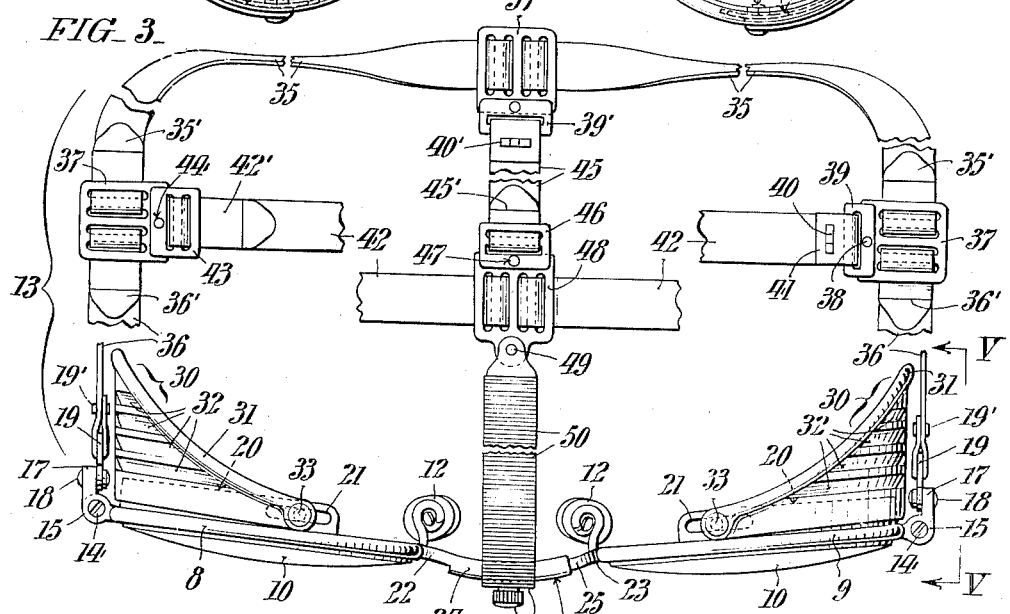
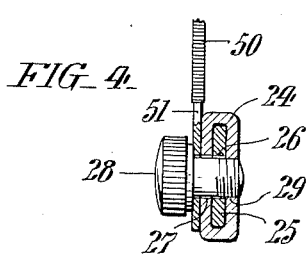
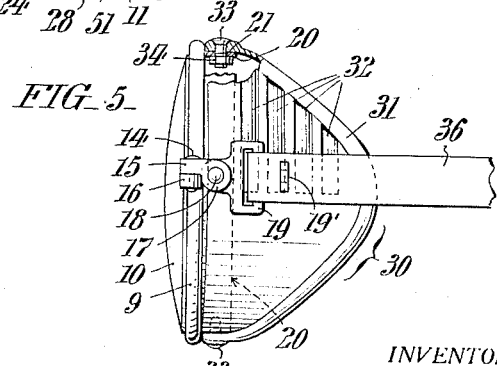
WITNESSES
Hubert Fuchs
Thomas W. Kerr Jr.
INVENTOR:
Jay W. Hayward,
BY Paul & Paul
ATTORNEYS.

Patented Apr. 18, 1950

2,504,524

UNITED STATES PATENT OFFICE 2,504,524

SAFETY SPECTACLE BRIDGE LIFT

Jay W. Hayward, Paulsboro, N. J.

Application August 21, 1946, Serial No. 691,937

6 Claims. (Cl. 2—14)

This invention has general reference to ophthalmic devices while it relates, more particularly, to the species thereof commonly termed goggles and/or safety spectacles; that is to say the type which are designed to afford, in addition to sight assistance, a safeguard for the wearer's eyes from glare strain, injury by flying particles and so forth, as well as in some instances to additionally serve for keeping the eyes cool and obviate lens clouding.

Heretofore many attempts have been made to provide safety spectacles which not only eliminate pinching and disfigurement of the nose, that tend to reduce irritative soreness and kindred discomfort, regionally between the eyes and ears; but owing to their liability of easy derangement they have not been generally successful.

The primary object of my invention, accordingly, is to provide a novel type or form of safety spectacles which positively overcome the above noted disadvantageous characteristics.

Another object of this invention is the provision of safety spectacles which substantially remove all weight from off the bridge of the wearer's nose as well as definitely eliminate development of any irritation intermediate the temples and about the ears.

A further object is to provide a pair of safety spectacles which are suspended from the wearer's head and which includes refinements whereby perfect adjustments can be quickly made with positive assurance against interference with the normal vision of the wearer.

A still further object of this invention is to provide a novel structure of safety spectacles which enables the same being accurately positioned in front of the eyes with a minimum of focalization.

Other objects, with ancillary advantages of this invention will become apparent from the following detailed explanation of a preferred embodiment thereof, shown by the accompanying two sheets of illustrative drawings and wherein like reference characters designate corresponding parts in all the views; while the claims more particularly define the features of novelty over the prior art.

In the drawings:

Fig. 1, Sheet 1, is a fanciful portraiture of a man's wearing safety-spectacles embodying the improvements of this invention.

Fig. 2, Sheet 2, is a front view of the improved safety-spectacles with a fragmentary portion of a suspension element hereinafter fully explained.

Fig. 3 is a top plan view of the safety spectacles with parts broken out or removed to somewhat compact the illustration without detracting from the clarity thereof.

Fig. 4 is a staggered section taken approximately as indicated by the angled-arrows IV—IV in Fig. 2.

Fig. 5 is a side elevation taken as indicated within the confines of the angled-arrows V—V in Fig. 3, and having a fragmentary portion in section to better illustrate details hereinafter set forth.

Fig. 6, Sheet 1, is a detail view, drawn to larger scale, of a side ventilating shield component of the safety-spectacles; and Fig. 7 is a section on the plane VII—VII of Fig. 6.

Referring to the drawings, my improved safety-spectacles generally comprise left-hand and right-hand split frames or holder elements 8, 9 for the lenses 10; said elements being connected by an adjustable bridge-bar 11; associated guards or nose-pieces 12, and a supporting-harness or equipment therefor, comprehensively designated 13 in Figs. 1 and 3, which is adapted for variable adjustment so as to snugly fit the head of the wearer of the spectacles, and whereby said spectacles can be accurately positioned in front of the eyes and so maintained, irrespective of head movement in any direction, without disturbing the proper pupilary relation between the lenses 10 in respect to the wearer's eyes.

More specifically the split holder elements 8, 9 are of any desirable shape and cross-section for stationary retention therein of the lenses 10, by aid of suitable securing means 14 engaged in terminal lugs or projection 15, 16; the upper 15 whereof, as best understood from Figs. 1, 3 and 5, is preferably formed to include a rectangularly-related short temple extension 17 affording pivoted connection, by appropriate means 18, for a flat link 19 having capacity for vertical movement. It is also to be particularly noted that the holder elements 8, 9 each includes an integrally formed or interfitted rearwardly-directed partially-perimetric pliant material flange 20, such flange extending peferably around the outer major portions of the respective lenses 10 and frame elements 8, 9 as clearly shown in Figs. 2 and 3, while each flange 20 is provided with elongate slots 21, for a purpose hereinafter explained.

Referring now to the adjustable bridge-bar 11, as best understood from Figs. 2 and 4, the same comprises relatively-telescopic stem components 22, 23 rigidly secured to the associated lens-holder elements 8, 9; while one of them, 22 for example, embodies a transverse tubulate extension 24, preferably of rectangular cross-section, for movable reception therein of a flat bar section 25, forming a part of the other stem component 23, whereas said bar section 25 is provided with a series of spaced holes 26 therethrough. It is also to be observed that the tubulate extension 24 is of the longitudinally split species so as to define a lengthwise gap 27. In order to secure the parts 24 and 25 at the proper relative extension so that the pieces 12 seat comfortably on the wearer's nose at the desirable adjustment use is made of a clamp-stud 28 having free passage through the gap 27 and the selected hole 26 with screw engagement into a correspondingly-threaded aperture 29, provided for the purpose, in the wall web portion of the tubulate extension 24, in an obvious manner.

Adjustably coactive with each lens-holder perimetric flange 20 is side-shield 30 preferably made of suitable plastic material, with the relatively inner arcuate edge thickened or beaded at 31, see Figs. 6 and 7 to best advantage, to prevent distortion under different temperature conditions as well as to better maintain the shield in snug engagement against the temple regions of the wearer. Each shield 30 is preferably provided in the upper half portion with a series of outwardly-directed spaced slats or louvers 32 for the purpose of ventilation and whereby the eyes of the wearer are protected from becoming inflamed, while the lenses 10 are safeguarded against troublesome clouding. It will also be obvious that the respective shields 30 may have the upper half portion thereof made opaque with the lower half transparent; or, said shields may be made of perforate plastic in an obvious manner. In order that each side-shield 30 may be capable of adjustment, so that the beaded-portion 31 can better conform to the wearer's eye regional facial surface, each said shield is fitted with opposed terminal clamp-screw 33, having passage through elongate slots 21 in the associated perimetric flange 20, and securement at such adjustment by a lock nut 34, without imposing any unnecessary pressure against the face.

Referring now to the head-harness or equipment 13, hereinbefore mentioned, the same comprises a resilient material back-strap 35 adapted to engage the lower rear portion or base of the wearer's head; substantially aligned temple extensions or side-straps 36 having their forward ends looped through and attached to the flat-links 19 aforesaid by suitable means 19', while it will be seen that the respective free ends 35' of the back strap 35 are are retroverted through one half-portion of a duplex flat-buckle 37—that is to say a buckle having no relatively movable tongue or tongues—while the free ends 36' of the straps 36 are similarly coupled to the other half portion of the respectively related buckles 37. One of the buckles 37—that at the right hand side in Fig. 3 for example—has attached thereto, as by a pivot 38, an upwardly directed flat link 39, to which is connected, by suitable means 40, the looped end 41 of a transverse or over-head strap 42, the free end 42' whereof is retroverted through a single flat-buckle 43, in turn pivoted by a pin 44 to the relatively opposed or left-hand duplex-buckle 37 as viewed in Fig. 3. In addition, it is to be particularly observed that the back-strap 35 is medially lengthwise threaded through a duplex flat-buckle 37' having a pivotal flat-link 39', while to the latter there is looped and attached by suitable means 40' the one end of a rear suspension strap 45. The free end 45' of the strap 45 is adjustably attachable to a single-type flat-buckle 46 fulcrumed at 47 to a duplex-type crown-buckle 48 medially carried by the overhead strap 42, above described.

Pivoted at 49 to the crown-buckle 48 is the back end of a forwardly-directed flexible suspension element 50, preferably of the flat strip type, and having the apertured forward end 51 coupled, to the clamp-stud 28 aforesaid, of the relatively telescopic bridge-bar portions 24, 25, as clearly apparent on an examination of Figs. 1, 2, 3 and 4.

From the foregoing it will be clearly apparent that, on initial application of my improved safety spectacles to the head, provisions are made for almost what may be termed micrometric adjustment of the bridge components 22, 23, as well as the head-harness or equipment 13, also that by making the several strap members 35, 36, 42 and 45 of resilient material said harness can be similarly adjusted to the size of the head with positive preassurance of maximum wearing comfort; whereas the flexibility of said strap members enables easy removal of the spectacles and ready replacement thereof. It is further to be understood that after initial adjustment of the lenses 10, in front of the wearer's eyes, such adjusted position is maintainable almost indefinitely, when the spectacles are subsequently removed or re-applied with reasonable care.

Finally the improved spectacles may be made of any desirable materials and in various sizes and, when worn, the head can be freely moved in all directions without fear that said spectacles may fall off or shift their position relative to the eyes.

Having thus described my invention, I claim:

1. Safety-spectacles comprising a pair of lens holders; telescopic bridge-bar components connecting the lens-holders and having dependent nose-pieces; a clamp-screw for securing the bridge-bar components at the required telescopic adjustment; perforate side shields carried by the lens holders with means whereby they are peripherally and/or laterally adjustable; a harness for supporting the spectacles from the wearer's head, with the dependent nose pieces aforesaid flankingly resting on the wearer's nose, said harness including a back, opposed side, an over-head, and a rear suspension strap of resilient strip material; a forwardly-directed flexible suspension element directly connected at one end to the crown region of the transverse overhead harness strap and at the other end releasably to the bridge-bar by the clamp-screw aforesaid; and means whereby the several straps are individually adjustable.

2. The invention of claim 1 wherein the bridge-bar comprises opposed stem components, one of which embodies a tubulate extension, preferably of rectangular cross section, with a lengthwise gap, and an opposingly related screw-threaded hole; the other of said stem components including a bar of corresponding cross section, movable in the tubulate extension of the first mentioned component, and longitudinally spaced holes in said bar section for registration with the lengthwise gap in the tubulate extension aforesaid; and a screw-stud, having free passage through the gap and a selected hole in the bar section, for engagement in the tubulate extension threaded hole, whereby the stem components are secured together at the desirable telescopic adjustment, 3. The invention of claim 1 wherein the perforate side shields are supported by rearwardly-directed partially-perimetric pliant flange portions of the lens holders and, having elongate slots in the end portions thereof wherein terminal clamp screws through said slot pivotally connect each said side shield to the associated flange with capacity for perimetric and pivotal adjustments.

4. The invention of claim 1 wherein each side shield is preferably made of sheet plastic to include a perforate upper opaque section and an imperforate lower transparent section.

5. The invention of claim 1 wherein each side shield embodies outwardly-directed spaced louvres.

6. The invention of claim 1 wherein the several harness straps are made of elastic strip material; wherein the adjustment effecting means for said straps comprise single and multiple-section flat-buckles having no relatively movable tongue or tongues respectively; wherein one of said multiple-section buckles includes a pivotally connected similar type single-buckle element; and wherein the remainder of said buckles include pivotally connected flat links.

JAY W. HAYWARD.

REFERENCES CITED

The following references are of record in the file of this patent:

UNITED STATES PATENTS

| Number | Name | Date |
|---|---|---|
| 624,369 | McLernon | May 2, 1899 |
| 886,209 | Henry | Apr. 28, 1908 |
| 1,248,758 | Tully | Dec. 4, 1917 |
| 1,370,806 | Garner | Mar. 8, 1921 |
| 1,612,750 | Stake | Dec. 28, 1926 |
| 1,647,107 | Franchini | Oct. 25, 1927 |
| 1,754,694 | Neuwirth | Apr. 15, 1930 |
| 1,768,597 | Gwathmey, Jr. | July 1, 1930 |
| 1,825,615 | Heckman | Sept. 29, 1931 |
| 1,838,649 | Baker | Dec. 29, 1931 |
| 2,126,697 | Bigelow | Aug. 16, 1938 |
| 2,300,365 | Wagner | Oct. 27, 1942 |

FOREIGN PATENTS

| Number | Country | Date |
|---|---|---|
| 21,341 | Norway | Aug. 16, 1909 |
| 330,725 | Great Britain | June 19, 1930 |